Patented Nov. 24, 1931

1,832,971

UNITED STATES PATENT OFFICE

RUDOLF ENGELHARDT, OF LEVERKUSEN-ON-THE-RHINE, GERMANY, ASSIGNOR TO I. G. FARBENINDUSTRIE AKTIENGESELLSCHAFT, OF FRANKFORT-ON-THE-MAIN, GERMANY

SHUTTLES FROM WOOD

No Drawing. Application filed June 27, 1930, Serial No. 464,433, and in Germany July 31, 1929.

The present invention relates to improved shuttles from wood.

The majority of shuttles employed in the weaving industry are maufactured from wood; only a certain small number of types of wood are suited for this purpose, which, however, do not completely fulfil in every particular all the requirements in reference to resistivity, weight and the like. Thus, for example, it is necessary in many cases to insert lead, in order to bring the weight to the desired degree.

In accordance with the present invention shuttles are obtained, which are superior to those hitherto known, by employing as the working material wood, which is impregnated with a chlorinated hydrocarbon solid at the temperature at which the shuttles ars used, that means at room temperature or a slightly higher temperature and being indifferent against the materials with which it comes in contact, that is to say, there are to be taken into consideration for the purpose of the invention such chlorinated hydrocarbons as do not split off chlorine. The melting point of the impregnating substance should not lie too high, but substances, the melting point of which is higher than the temperature at which the type of wood employed is prejudicially affected can likewise be employed for the present purpose, provided that they can be liquefied by means of lower melting additions, such, as for example, paraffin, Montan wax or other chlorinated hydrocarbons of low melting point, at temperatures, at which the wood does not suffer. Higher chlorinated hydrocarbons, such as for example, chlorinated naphthalenes of a chlorine content of about 45–60% and chlorinated diphenyl solid at room temperature have proved to be particularly suitable for the purpose in question.

When applying the term "indifferent chlorinated hydrocarbon solid at room temperature" in the claims, this is to include all the properties referred to above with regard to melting point and chemical behavior of said chlorinated hydrocarbons.

The manufacture of shuttles can be carried out by impregnating blocks of suitable size and then working up to shuttles with the customary machines. The shuttles can, however, be subjected to the treatment at various stages of their manufacture.

The invention is illustrated by the following examples, without being limited thereto:

Example 1.—A block of ash wood is dried for one hour at 120° C. in vacuo in an iron container, then covered over with melted chloronaphthalene of about 50% chlorine content and heated for half an hour at 120–125° C. under a pressure of 5 atmospheres. After the removal of the externally adhering chloronaphthalene the block can be worked up to shuttles in the customary manner. The shuttles thereby obtained are distinguished by increased strength, very smooth surface, insensitiveness towards moisture and high weight. The weight in this case is approximately twice as high as in a shuttle of the same size produced from non-treated wood.

Example 2.—A block of born beam is impregnated as above with a wax, produced according to Example 1 of the British specification No. 309,421. The shuttles obtainable therefrom likewise show the advantages mentioned above and in addition to an increase of 30% in breaking strength show an increase of weight of 50–100%.

A shuttle produced from very dense persimmon wood is likewise still improved by impregnation. Thus, for example, an increase of weight from about 30–35% is achieved.

Example 3.—1000 parts by weight of chlorinated diphenyl with a chlorine content of about 60% are heated to 110–120° C. in an autoclave. Into the molten mass there are introduced 500 parts by weight of cut-up red-beech wood kept in a supporting-frame. The autoclave is then closed and evacuated at 120° C. for 1½ hours. After opening the autoclave the supporting-frame is taken out of the autoclave, while the chlorinated diphenyl is still liquid. The wood thus impregnated is worked into shuttles.

I claim:

1. As a new product of manufacture shuttles from wood being impregnated with an indifferent chlorinated hydrocarbon solid at room temperature.

2. As a new product of manufacture shuttles from wood being impregnated with an indifferent chlorinated aromatic hydrocarbon solid at room temperature consisting of two phenyl nuclei.

3. As a new product of manufacture shuttles from wood being impregnated with a chlorinated naphthalene of a chlorine content of about 45–60%.

4. As a new product of manufacture shuttles from wood being impregnated with a chlorinated naphthalene of about 50% chlorine content.

In testimony whereof, I affix my signature.
RUDOLF ENGELHARDT.